United States Patent

[11] 3,590,440

| [72] | Inventor | Francis W. Cook, Jr.<br>Newington, Conn. |
|---|---|---|
| [21] | Appl. No. | 826,910 |
| [22] | Filed | May 22, 1969 |
| [45] | Patented | July 6, 1971 |
| [73] | Assignee | The New Britain Machine Company<br>New Britain, Conn. |

[54] CLAMP MECHANISM FOR A PLASTICS INJECTION-MOLDING MACHINE
6 Claims, 5 Drawing Figs.

| [52] | U.S. Cl. | 18/30 |
|---|---|---|
| [51] | Int. Cl. | B29f 1/00 |
| [50] | Field of Search | 18/30 LA, 30 LM, 30 LV |

[56] References Cited
UNITED STATES PATENTS

| 2,416,349 | 2/1947 | Renier | 18/30 |
|---|---|---|---|
| 2,431,843 | 12/1947 | Swoger | 18/30 |
| 2,676,357 | 4/1954 | Shannon | 18/30 |
| 2,689,978 | 9/1954 | Roger | 18/30 |
| 2,711,561 | 6/1955 | Studli | 18/30 |
| 2,938,232 | 5/1960 | Martin | 18/30 |
| 3,191,235 | 6/1965 | Rougement | 18/43 |

Primary Examiner—J. Howard Flint, Jr.
Attorneys—Robert S. Smith, David S. Urey, Alan C. Rose and Alfred B. Levine ABSTRACT: The invention contemplates vertical-action hydraulic mold-positioning and clamp mechanism carried above the region of mold-filling, in a plastics injection-molding machine having provision for selective horizontal discharge of plasticized melt. The nature of the mold-clamp mechanism is such that it will self-adapt to bending deflections of frame parts, in the presence of high clamp-force pressures. In the hydraulic mechanism disclosed, major displacements are achieved by a relatively low-pressure system, whereas clamp forces are generated by a relatively high-pressure system. For safety, the high-pressure operation involves a minimum of displaced fluid, and means are provided to automatically vent the high-pressure system in the event of such downward positioning of parts as is indicative of failure to install a complete mold.

PATENTED JUL 6 1971

INVENTOR
FRANCIS W. COOK, JR.
BY
Sandoe, Hopgood & Calimafde
ATTORNEYS

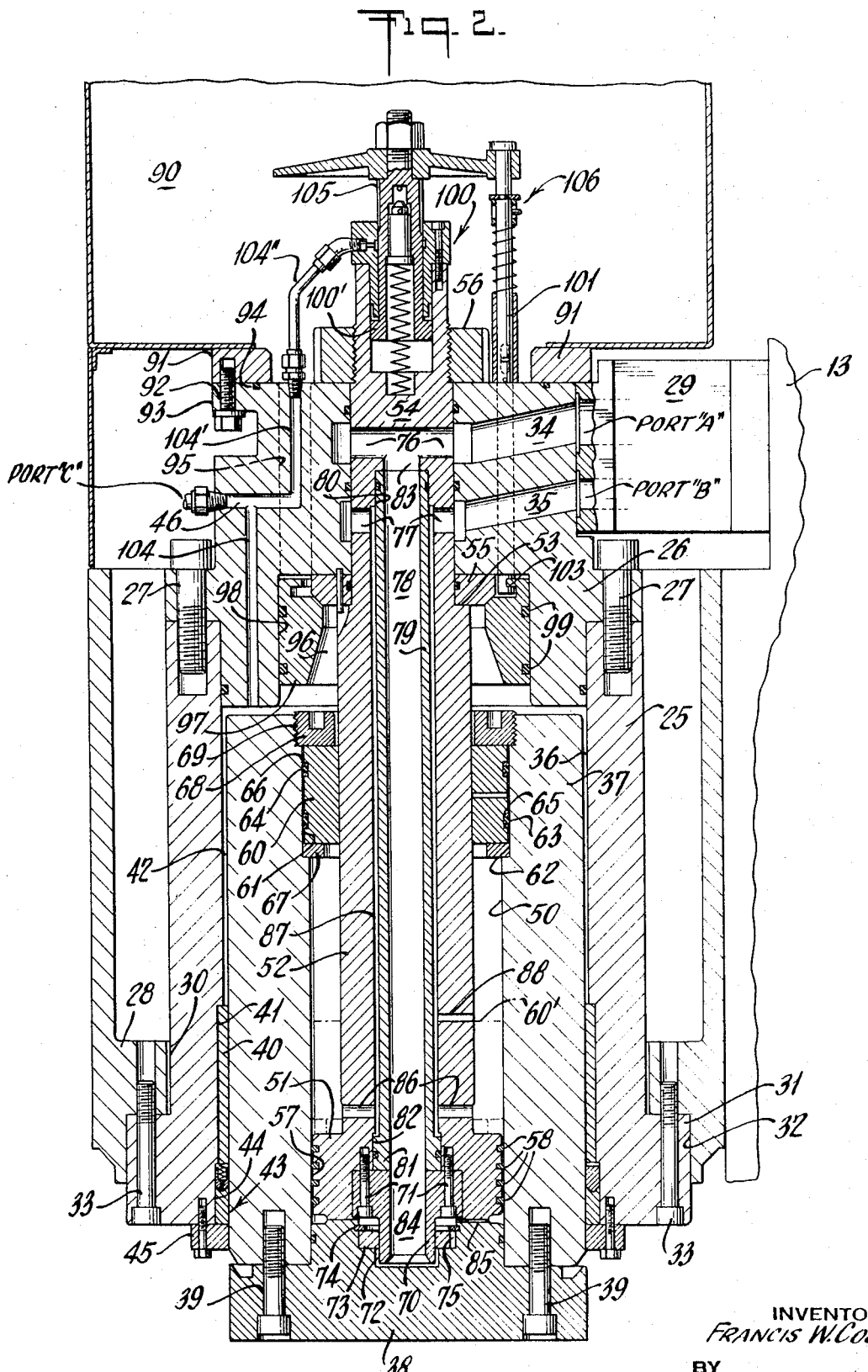

CLAMP MECHANISM FOR A PLASTICS INJECTION-MOLDING MACHINE

This invention relates to plastics injection-molding machines and in particular to such a machine in which vertically separable mold elements are served by mold-positioning and clamping mechanism carried above the region of mold support.

In machines of the character indicated, it is desirable to locate the mold-positioning and clamping mechanism vertically above the region of mold support in order to provide maximum operator access to the mold region, as when setting-up, placing mold-cavity inserts, removing finished products, and the like. Also, in certain of such machines, automated or semiautomated mold-transfer mechanism requires greater accessibility to and around the mold-support region. These requirements must be met with mold-clamp support structure that is equal to the task of generating such magnitude of mold-clamp forces, and precision of their application, as are required for reliable mass-production and adaptability to various mold configurations.

It is an object of the invention to provide an improved machine meeting the foregoing requirements.

Another object is to provide improved vertical-action mold-positioning and clamping mechanism which is inherently self-adapting to frame deflections which might otherwise misalign the axes of mold-part positioning and clamping.

A further object is to provide safety mechanism in structure of the character indicated, whereby mold-clamping forces cannot be applied unless the machine is equipped with a mold.

A still further object is to provide improved hydraulic clamping mechanism with enhanced clamping effort for a given main-ram diameter.

A general object is to provide improved mold-clamp mechanism for an injection-molding machine whereby access to the region of mold support is substantially increased to permit expanded machine accommodation to automated mold-indexing, application of mold-cavity inserts and the like.

Other objects and various further features of novelty and invention will be pointed out or will occur to those skilled in the art from a reading of the following specification in conjunction with the accompanying drawings. In said drawings, which show, for illustrative purposes only, a preferred form of the invention:

FIGS. 3, 4 and 5 are like simplified diagrams schematically indicating parts relations at each of three stages of the cycle of operation of the invention.

Briefly stated, the invention contemplates vertical-action hydraulic mold-positioning and clamp mechanism carried above the region of mold-filling, in a plastics injection-molding machine having provision for selective horizontal discharge of plasticized melt. The nature of the mold-clamp mechanism is such that it will self-adapt to bending deflections of frame parts, in the presence of high clamp-force pressures. In the hydraulic mechanism disclosed, major displacements are achieved by a relatively low-pressure system, whereas clamp forces are generated by a relatively high-pressure system. For safety, the high-pressure operation involves a minimum of displaced fluid, and means are provided to automatically vent the high-pressure system in the event of such downward positioning of parts as is indicative of failure to install a complete mold.

Figure 1:
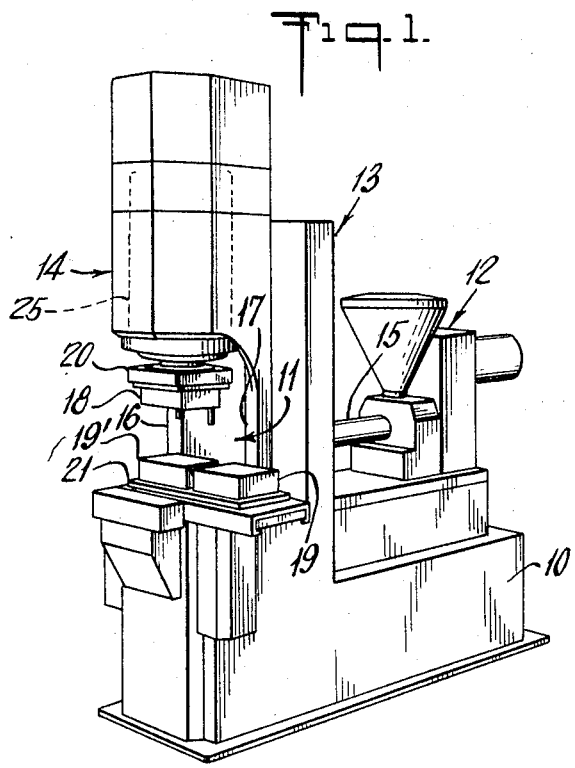
FIG. 1 is a simplified perspective view of a machine embodying the invention.

In FIG. 1, the invention is shown in application to a plastics injection-molding machine of the horizontally oriented, reciprocating-screw variety. A bed or frame 10 supports plasticizing and injection mechanism 12 of such a machine, serving a mold region 11, and the frame also includes upstanding or pedestal means 13 which carries positioning and clamp mechanism 14, operative on parts in the mold region 11. As far as the plastics-delivery mechanism 12 is concerned, it suffices to identify an elongated barrel 15 within which materials gravity-fed from a hopper 16 are plasticized to accumulate melt for each successive injection or discharge into a newly presented mold cavity at region 11. It will be understood that the forward end of barrel 15 includes a discharge nozzle adapted to engage the sprue hole serving successive newly presented mold cavities, within the open span between laterally spaced legs 16—17 of the pedestal 13. Synchronizing and control means for the various operations of the plasticizing and injection mechanism 12 and for mold-clamp mechanism in general form no part of the invention and therefore will not be described.

The particular machine which embodies the invention is of the variety in which molds accommodated at region 11 comprise separable upper and lower members, such as the upper mold half 18 and the lower mold half 19. The upper mold half 18 is carried by an upper platen 20 constituting part of clamp mechanism 14, and the lower mold half 19 is fixed to a frame-based platen or support 21. The lower platen or support 21 may form part of automated indexing means for successively positioning like but separate lower mold halves in the molding position; in the form shown, the mold halves 19-19' meet this description and are successively moved into and out of molding position as the support or table 21 is shuttled or indexed, from the position shown, to the position in which the lower mold half 19' is positioned for coaction with upper mold half 18. In the latter situation, table 21 and lower mold half 19 are displaced to the right, for parts removal, while clamping, molding and curing proceed in the mold defined by halves 18—19'. It will be understood that, by providing pedestal 13 behind the path of mold indexing, greatest access is afforded to the operator, and if desired, for manual or automated parts-insertion within the then-exposed lower mold half 19 or 19', as the case may be.

In synchronized interlace with the indicated indexing operation, the mold-clamp mechanism 14 proceeds through its cycle which, for the form to be described comprises (a) rapid traverse of platen 18 from its raised or retracted position, to the mold-completing position, with upper and lower halves of the mold fitted together as indicated at 11, (b) application of elevated pressures at 14 to establish and maintain mold-clamp action during the mold-filling or injection-and-curing cycle of means 12, and (c) relief of elevated pressures and reversal of rapid traverse connections to effect withdrawal of platen 18 to raised position. The specific cycle of hydraulic actuation of clamp 14 will be described in connection with FIGS. 3, 4 and 5 after completing the description of mechanical and hydraulic elements, in connection with FIG. 2.

Figure 2:
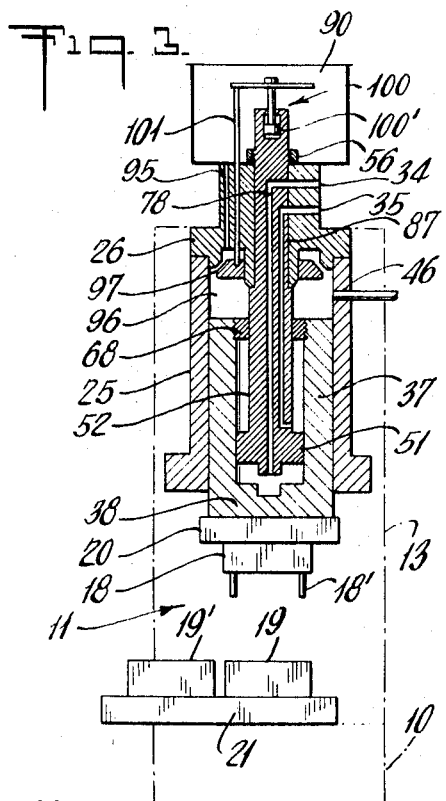
FIG. 2 is an enlarged vertical sectional view of mold-positioning and clamping mechanism in the machine of FIG. 1.

In FIG. 2, a main cylinder 25 is closed at its upper end by a head 26, secured thereto by bolts 27. Cylinder 25 is mounted to pedestal 13 by bracket 28. The bracket 28 is bored at 30 to accept upward assembling insertion of the body of cylinder 25, which is shown also to include a radial flange 31 to fit a counterbore 32; bolts 33 complete the lower mounting of cylinder 25. At its upper end, cylinder 25 is connected to hydraulic supply means 29 by way of head 26, and dashed outlines (labeled "Port A" and "Port B") suggest that means 29 serve the function of supplying some of the hydraulic control connections from the frame upright 13 to the control passages 34—35 in head 26.

The main bore 36 of cylinder 25 is vertically elongated for the telescoping accommodation of a similarly elongated main ram 37. Ram 37 is shown as an annulus, closed at its lower end by a cap 38, at bolts 39. Cap 38 may be formed as part of or may carry the upper platen 20. A relatively short bushing 40 in a first counterbore 41 near the lower end of cylinder 25 concentrically positions the main-ram axis, but substantial radial clearance 42 characterizes the remaining and major part of the telescoped relation between ram 37 and its bore 36. Yieldable gland means 43 in a second counterbore 44 seals the ram 37 in its bore 36, and a ring 45 carried by the bottom face of ram 37 provides firm reference for resilient axial loading of gland means 43. A connection 46 between a high-pressure "Port C" and a passage 104 is used when developing clamp pressures over the main ram 37.

An auxiliary or booster hydraulic actuator system is contained within the described main-ram system, for the rapid downward and retraction phases of the cycle of mold-closing and opening. Basically, this auxiliary system employs, as its cylinder, the bore 50 of main ram 37. The piston or ram 51 of the booster stem is axially fixed to the main cylinder by an elongated cylindrical tail or rod connection 52 to the head 26. In the form shown, rod 52 is stepped at a shoulder 53 to define a reduced end 54 which projects through and above the head 26. Shoulder 53 seats against a seating ring 55, which in turn is held against the lower side of the head 26, by the action of a clamp nut 56 against the upper side of the head 26. The effective length of the rod 52 below shoulder 53 is preferably such as to position the booster ram 51 substantially at the elevation of the lower end of the main cylinder 25. A radial clearance in the order of 10 to 12 mils is provided at 57 (between ram 51 and its bore 50) for purposes to be later explained, and this relatively large clearance is shown sealed by spaced piston rings 58.

The cap 38 serves as the closure of the head end of booster cylinder 50. The tail end of cylinder 50 is effectively closed by a floating ring 60, axially piloted by a close sliding fit to rod 52 and having at 61 a relatively large radial clearance with cylinder 50, at the counterbore 62 thereof; the size of this clearance 61 may be of the order of magnitude stated at 57. Resilient "O"-rings 63—64 in leather-lined peripheral grooves 65—66 provide sealed resilient accommodation of offsetting axis misalignments between rod 52 and cylinder 50, at the tail end, as will later be more clear. A ring 67 seated in the bottom of counterbore 62, and an annular nut 68 driven against the base of a tapped further counterbore 69, provide bearings for guidance of radial displacements of ring 60 within its clearance 61.

As shown, the lower end of the booster ram 51 is formed for located reception of the cap 38, upon each return or retraction of the upper platen. For this purpose, a flanged stud 70 is bolted at 71 in a counterbore at the base end of ram 51. Stud 70 is gently rounded or conically reduced at its end 72, for nonfouling engagement with the chamfer of a floating pilot ring 73, loosely held by snapring means 74 within a short counterbore 75 in cap 38. It will be understood that the action of the described structure at stud 70, ring 73, and related parts, provides dashpot action to cushion the approach of the main ram to its fully retracted position.

Booster-ram positioning control employs concentric inner and outer supply passages within rod 52, served respectively by upper-end manifolded connections 76—77 to the "Port A" and "Port B" passages 34—35 already identified. The inner of these passages 78 is essentially defined by an elongated tube 79, located at its upper end by a counterbore 80 deep within the rod 52, and located at its lower end by the counterbore of a bushing 81 within a further counterbore 82 in rod 52; passage 78 is completed by bore connection 83 to the manifolded connection 76, and by the continuous bore 84 of stud 70. Radial grooving 85 at adjacent faces of piston 51 and cap 38 assure free flow of hydraulic fluid via passage 78 and over the full effective area beneath the booster ram or piston 51. In similar fashion, radial passages 86 in rod 52 and adjacent ram 51 provide free flow of hydraulic fluid via the annular passage 87 (outside tube 79 and within rod 52) and over the full effective tail area of ram 51, it being understood that the tail area of ram 51 is the reference upon which main-ram lifting force is based, by reason of the tail-closing sealed ring 60.

To complete the general identification of clamp-mechanism parts, a surge tank or reservoir 90 having a base-mounting adapter or ring 91 is bolted at 92 to the flanged upper face 93 of the main-cylinder head 26, the same being sealed, at 94, against external leakage. One or more through-passages 95 in head 26 provides fluid communication from tank 90 to the region 96, above the head end of the main ram 25, such communication being under the control of the annular member 97 of the prefill valve, coacting with the seat member 55. The prefill valve member 97 is guided for vertical reciprocation in a counterbore or skirt 98 forming part of the cylinder head 26, and spaced rings 99 complete the seal at this guided interfit. To actuate the prefill valve member, valve means 100 (carried at the upwardly projecting end of rod 52) is operative to displace one or more control rods as at 101 in the section shown. Rod 101 is vertically reciprocatable in a guide bore 102 through head 26, and interengaging means 103 on rod 101 and valve member 97 complete the connection. Various adjustable connections and preloading devices are shown in connection with the prefill-actuating valve means 100, but these are not significant to the claimed invention and need not be further described. It suffices merely to note that, responsive to suitable control means (not shown) displacement of the piston 100' of valve means 100 may effect corresponding opening and closing displacements of the prefill valve means 100, and that a bypassing vent connection 104–104'–104'' across valve member 97 is blocked in the upper or "closed" position of piston 100' and vented (via groove 105 to tank 90) when displaced downwardly to actuate member 97 in the opening direction; a spring-loaded lost-motion connection at 106 assures that venting will occur at groove 105 before control rod 101 is called upon to forcibly displace member 97 in the opening direction.

Figure 4:
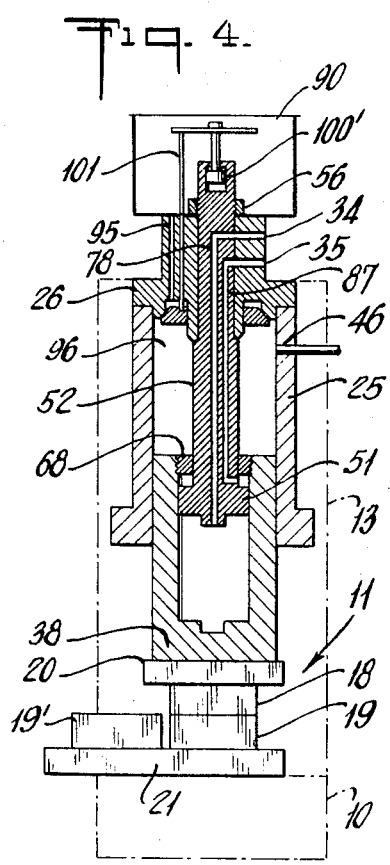
Figure 5:
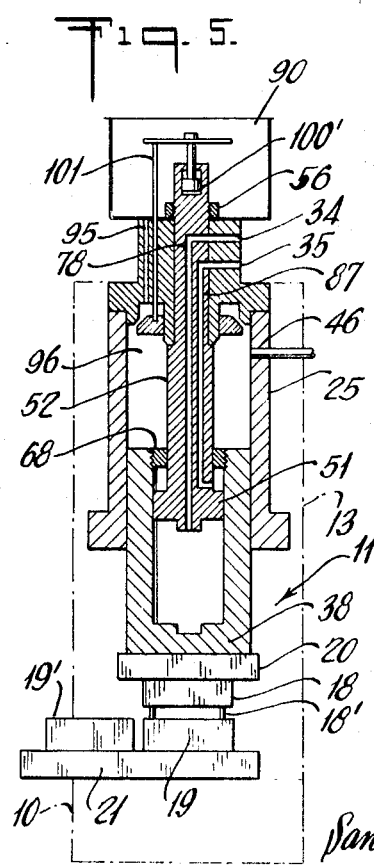

Hydraulic action will be better understood in reference to the simplified diagrams of FIGS. 3, 4 and 5, commencing with the elevated or retracted relationship of FIG. 3, wherein the upper mold half 18 is poised to descend and locate (by engagement means 18') with the lower mold half 19. Control valving (not shown) is operative to apply pressure via Ports "A" and "B," thus (by reason of the effective-area difference at the head and tail ends of ram 51) causing pressure-fluid flow via Port "A" and passage 78 to the "FAST-CLOSE REGION" below the booster ram 51; at the same time, Port "B" admits return fluid displaced (from the "FAST-OPEN REGION") through passage 87 as main ram 37 descends. Also, with valve 97 actuated to its open condition, accumulated fluid in the reservoir or surge tank 90 is drawn into the "MAIN-RAM REGION" 96; upon achievement of the down or mold-closed position of FIG. 4, fluid from tank has completely filled the now-enlarged "MAIN-RAM REGION," and the prefill valve 97 is actuated to the closed position shown.

In the FIG. 4 position, elevated or clamp-force pressure is simultaneously applied at Ports "A" and "C", so as to develop maximum clamping effort, while injection-molding and curing proceed. The clamping effort will be seen as the integration of such pressure over the full effective area of booster ram 51 (applied in the "FAST-CLOSE REGION"), plus the integration of such pressure over the full effective area of the main ram 37 (applied in the "MAIN-RAM REGION" 96). Significantly, the sum of these two integrations exceeds the total force that could be obtained by applying the same elevated pressure to a single ram having the same effective diameter as main ram 37; and the extent to which this gain in effort is achieved reflects double-effort contribution over the effective cross-sectional area of the "FAST-OPEN REGION," between rod 52 and the bore 50 of the main ram.

Having completed the curing of plastic injected into mold 18—19, the elevated clamp pressures are cut off, and valve 100 is operative to open the prefill valve 97. This condition is shown in FIG. 5, which also depicts an instant of time just after pressure fluid has entered Port "B" and begun to pass in line 87 to the "FAST-OPEN REGION," for quick upward retraction of the upper mold half 18. During this upward retraction, the open valve 97 allows fluid to refill the surge tank 90, and the Port "A" connection permits venting of fluid displaced upon reduction of volume in the "FAST-CLOSE REGION." After full retraction, and after indexing the other lower mold half 19' into alignment with upper mold half 18, the described cycle repeats.

It will be seen that the invention provides relatively simple structure for attaining the stated objects. Not only does the hydraulic mechanism provide economy in effective ram cross-sectional area, for a given clamp capacity, but the provision of relatively short bushing support at 40 permits the main ram to adapt itself to the truly perpendicular application of clamp forces to mold 18—19 in spite of the unavoidable bending deflection of the upright frame 13, however slight the degree of bending, due to offset nature of clamp support thereon. The provision of such relatively large clearance as 10 to 12 mils at 57 and at 61, and even larger clearance at 42, enables a 12-inch diameter main ram, with an 8-inch stroke capability, to adapt squarely to the closed mold even though the axis misalignment between main ram 37 and its cylinder 25 may be as great as 0.05 to 0.06 degrees due to bending deflection of the frame; under these dimensional circumstances, and with a 6.5-inch diameter booster ram, the clamp mechanism has a 130-ton capacity, using high-pressure fluid at 2000 p.s.i.

Further in addition to such mechanical-interference techniques (not illustrated) as may be desired to positively prevent high-pressure drive of the main ram below its normal mold-clamping position, the invention provides automatic assurance against such an event, at a bypass port 88 extending radially through the rod 52 at a low axial location, to vent high-pressure clamping fluid to the then-exhaust-connected passage 87 to Port "B." The light phantom outline 60' shown in FIG. 2 just below the bypass port 88 will be understood to suggest the lowered position of closure ring 60 should such excessive downward positioning of the main ram occur.

Although the invention has been described in detail for the preferred form shown, it will be understood that modifications may be made without departing from the scope of the invention as defined in the claims.

What I claim is:

1. A plastics injection-molding machine, comprising a base frame, means carried by said frame and including an injection means for selectively discharging plasticized melt on a generally horizontal axis, spaced upper and lower mold-support platens for positioning the sprue hole of vertically separable mold to receive melt discharge from said injection means, said lower platen being directly supported on said frame and said upper platen being vertically movably supported on said frame; the upper platen support comprising pedestal frame means united with said base frame and extending upwardly therefrom in adjacency with the region of lower-platen support, hydraulic means including piston and cylinder elements one of which is secured to said pedestal frame means and the other of which carries said upper platen, said hydraulic elements being actuable vertically for upper platen positioning into and out of mold-clamping relation with said lower platen, radially yieldable seal means between said elements, said hydraulic elements having a close-clearance radially locating relation at essentially a single longitudinally limited region of axial overlap and having otherwise such substantial radial clearance as to permit misalignment of the respective axes of said hydraulic elements against the yielding action of said seal means; whereby in the presence of elastic bending of said pedestal frame means, as during application of mold-clamping pressures to said hydraulic elements, said elements will self-adapt their axial misalignment to achieve uniform mold-clamping action while filling a clamped mold from said injection means.

2. The machine of claim 1, wherein said hydraulic elements comprise a main cylinder secured to said pedestal frame means and including a head closing the upper end of said cylinder, a main cylindrical ram vertically movable within said cylinder and carrying said upper platen at the lower end of said main ram, said main ram having a cylindrical cavity coaxial with the ram axis and open at the tail end of said ram, a booster ram having sealed slidable relation in said cylindrical cavity and including a fixed elongated tail connection to said head, closure means establishing a sealed slidable relation between said tail connection and the upper end of said main ram, first pressure-fluid communicating means selectively supplying pressure fluid within said cavity to the respective regions above and below said booster ram for vertically actuating said main ram in said main cylinder in a reciprocating cycle of mold-closing and mold-opening displacement of said upper platen, and second pressure-fluid communicating means selectively supplying fluid pressure to the region between said head and the upper end of said main ram for applying mold-clamping pressure when said main ram is in the mold-closed position.

3. The machine of claim 2, in which the elongation of said hydraulic elements is such that said main ram may be downwardly displaced to a position below normal mold-clamping position, and safety venting means including a passage in said tail connection, said passage including a port near the lower end of said tail connection and vertically positioned to be fully traversed by said closure means only when said main ram has been downwardly displaced beyond its normal mold-clamping position; whereby in the event of downward movement of said main ram beyond normal mold-clamping position, as may occur when one or more mold parts have not been installed on said platens, any inadvertent supply of mold-clamping pressures will be vented and thus ineffective to apply mold-clamping force to said main ram.

4. The machine of claim 2, in which said hydraulic means includes a surge tank carried by said pedestal frame means and having fluid connection to said main cylinder, said last-mentioned connection including a prefill valve and means for selectively opening and closing the same; whereby during a downward actuation of said booster ram while said prefill valve is open, hydraulic fluid from said surge tank may be drawn into the region between said head and said main ram; and further whereby after prefill-valve closure when said main ram is in mold-closing position, there may be a minimum of flow of hydraulic pressure fluid in the mold-clamping operation of said second pressure-fluid communicating means.

5. The machine of claim 2, in which a ram bushing carried by said main cylinder near the lower end thereof provides the guided support of said main ram and is the primary central positioning means for said main ram, said bushing being longitudinally short compared to the total longitudinally telescoped relation of said main ram and cylinder, and there being otherwise said substantial radial clearance relation between said hydraulic elements, whereby said bushing establishes a downwardly located region of accommodation of the mold-clamping axis to such main-cylinder axis misalignments as result from bending deflection of said pedestal-frame means.

6. The machine according to claim 2, in which said main ram includes means closing the cylindrical cavity thereof beneath said booster ram and in which second pressure-fluid communicating means selectively supplies fluid pressure to the region between said booster ram and the main-ram closure therebelow, whereby enhanced clamping effort is realized from the combined forces over said main ram and over said booster ram.